United States Patent
Rao et al.

(10) Patent No.: US 11,204,986 B1
(45) Date of Patent: Dec. 21, 2021

(54) CONTROL OF A PROMPT FOR A CREDENTIAL TO UNLOCK A STORAGE DEVICE

(71) Applicant: American Megatrends International, LLC, Norcross, GA (US)

(72) Inventors: Srinivasan N. Rao, Suwanee, GA (US); Karthika Ramasubramanian, Tamil Nadu (IN)

(73) Assignee: American Megatrends International, LLC, Norcross, GA (US)

( * ) Notice: Subject to any disclaimer, the term of this patent is extended or adjusted under 35 U.S.C. 154(b) by 190 days.

(21) Appl. No.: 16/456,759

(22) Filed: Jun. 28, 2019

Related U.S. Application Data (60) Provisional application No. 62/772,535, filed on Nov. 28, 2018.

(51) Int. Cl.
 *G06F 21/31* (2013.01)
 *G06F 21/57* (2013.01)
 *G06F 21/62* (2013.01)
 *G06F 12/14* (2006.01)
 *G06F 21/78* (2013.01)

(52) U.S. Cl.
 CPC .......... *G06F 21/31* (2013.01); *G06F 12/1408* (2013.01); *G06F 21/575* (2013.01); *G06F 21/6218* (2013.01); *G06F 21/78* (2013.01)

(58) Field of Classification Search
 None
 See application file for complete search history.

(56) References Cited

U.S. PATENT DOCUMENTS

| | | | |
|---|---|---|---|
| 8,769,667 B2* | 7/2014 | Nishida | G06F 21/78 726/17 |
| 10,599,848 B1* | 3/2020 | Yau | H04L 9/0866 |
| 2003/0070083 A1* | 4/2003 | Nessler | G06F 21/80 713/193 |
| 2004/0172545 A1* | 9/2004 | Ogata | G06F 21/575 713/189 |

(Continued)

OTHER PUBLICATIONS

Mutual Authentication and Trust Bootstrapping towards Secure Disk Encryption. Gotzfried. ACM. (Year: 2014).*

(Continued)

*Primary Examiner* — Venkat Perungavoor
(74) *Attorney, Agent, or Firm* — Newport IP, LLC; Leonard J. Hope (57) ABSTRACT

Control of a prompt for a credential to unlock a computer-readable storage device is provided. Some embodiments permit identifying a component that encrypted the computer-readable storage device and, depending on the identified component, prompting for such a credential. One embodiment can determine that a firmware encrypted the computer-readable storage device and can prompt for a password, for example, to unlock the computer-readable storage device during a boot-up process performed by the firmware. Other embodiments can determine that an operating system encrypted the computer-readable storage device, and can avoid the presentation of a prompt for a password, for example, during a boot-up process performed by the firmware. The computer-readable storage device can be a self-encrypting drive (SED) or another type of disk drive.

21 Claims, 4 Drawing Sheets

(56) References Cited

U.S. PATENT DOCUMENTS

| | | | |
|---|---|---|---|
| 2012/0254602 A1* | 10/2012 | Bhansali | G06F 9/4406 |
| | | | 713/2 |
| 2016/0267274 A1* | 9/2016 | Gschwind | G06F 9/4406 |
| 2018/0025177 A1* | 1/2018 | Lu | H04L 9/3228 |
| | | | 713/193 |
| 2018/0157849 A1* | 6/2018 | Ouyang | G06F 9/4406 |
| 2019/0042765 A1* | 2/2019 | Chung | G06F 21/78 |
| 2021/0034750 A1* | 2/2021 | Claes | H04L 9/0822 |

OTHER PUBLICATIONS

Encrypting Files and Volumes. Chapter 9. Edge. (Year: 2010).*
Bypassing Local Windows Authentication to Defeat Full Disk Encryption. Haken. (Year: 2015).*
CN 107818272 A. English Translation. (Year: 2018).*
CN 110020562 A. English Translation. (Year: 2019).*
Hard Disk Drive and Disk Encryption. Zlatanov. (Year: 2015).*

* cited by examiner

CONTROL OF A PROMPT FOR A CREDENTIAL TO UNLOCK A STORAGE DEVICE

CROSS-REFERENCE TO RELATED APPLICATION

This application claims the benefit of and priority to U.S. Provisional Patent Application No. 62/772,535, filed Nov. 28, 2018, the contents of which application are hereby incorporated by reference herein in their entireties.

BACKGROUND

Self-encrypting drives (SEDs) can be password protected by system firmware (FW) or by an operating system (O/S). A FW can lock an entire drive or an O/S can be used to lock only some logical block address (LBA) regions. Here, locking the drive includes encrypting the drive. During execution of a firmware on a computing system equipped with SEDs, users should be asked to enter the password only if a SED has been encrypted by system FW. Conventional computing systems commonly fail to provide such selectivity, resulting in inefficient, and generally tedious, implementations of boot-up processes.

Therefore, much remains to be improved in conventional technologies to control a prompt for a password to unlock computer-readable storage devices. It is in relation to this and other technical challenges that the disclosure presented herein has been made.

SUMMARY

The disclosure recognizes and addresses, amongst other technical challenges, the issue of controlling a prompt for a password to unlock a SED or another type of encrypted computer-readable storage device. Such storage devices can be installed in an embedded system, a desktop or laptop computing system, a blade service device, a tablet computing device, a smartphone, a videogame system, an in-vehicle infotainment (IVI) system, a wireless system, a cloud computing system, a data center system, a combination of the foregoing, or the like. Some types of computer-readable storage devices can be encrypted by using a password in two approaches: (1) System FW can encrypt the entire storage device and (2) an O/S can encrypt one or several portions of the storage space in the storage device. In light of commonplace security practices, only when a computer-readable storage device is password protected by system FW, a user should be prompted for a password during a boot-up process performed by the FW.

To that end, embodiments of the disclosed technologies permit or otherwise facilitate identifying a component that encrypted the computer-readable storage device and prompting for a password based on the identified component. Specifically, some embodiments of the disclosed technologies can determine that a FW encrypted the computer-readable storage device and can prompt for a password to unlock the storage device during a boot-up process performed by the FW. Other embodiments can determine that an O/S encrypted the computer-readable storage device and can avoid the presentation of a prompt for a password during a boot-up process performed by the FW. Accordingly, in sharp contrast to commonplace technologies, the disclosed technologies can limit the presentation of a prompt for a password in instances in which the FW (or a FW component thereof) has encrypted the storage device.

It is noted that this disclosure need not rely on any information about the type of encryption that is in place in a storage device, whether it is global encryption or encryption of band(s) of LBA ranges. Thus, embodiments of the disclosed technologies avoid relying on an administrator password while providing a secure and efficient control of the presentation of prompts for a password to unlock a storage device. Therefore, one of the technical improvements that the disclosure provides with respect to commonplace technologies includes greater boot-up efficiency. Other technical improvements also can be realized through the implementation of the technologies disclosed herein.

While embodiments of the disclosed technologies are described with reference to a password, the discloses subject matter is not so limited. Indeed, other types of credentials can be relied upon to lock and unlock a computer-readable storage device. Such credentials can include, for example, numerical codes or combinations of a password and a numerical code (as it would be the case in two-factor authentication configurations, for example).

This Summary is provided to introduce a selection of the technologies disclosed herein in a simplified form that are described in greater detail below in the Detailed Description. This Summary is not intended to identify key elements or essential elements of the claimed subject matter, nor is it intended that this Summary be used to limit the scope of the claimed subject matter. Furthermore, the claimed subject matter is not limited to embodiments or implementations thereof that solve any or all disadvantages noted in any part of this disclosure.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows:

DETAILED DESCRIPTION

The disclosed technologies permit controlling a prompt for a password to unlock a password-protected computer-readable storage device, such as a SED or another type of encrypted computer-readable storage device. More specifically, the disclosed technologies include devices and techniques that, individually or in combination, permit identifying a component that encrypted a computer-readable storage device, and prompting for a password based on the identified component. Embodiments of the disclosed technologies can determine that a FW encrypted the computer-readable storage device and can prompt for a credential (a password, a numerical code, or the like) to unlock the storage device during a boot-up process performed by the FW. In some aspects, locking the storage device includes encrypting all LBA blocks or a specified range of LBA blocks of the computer-readable storage device. Other embodiments can determine that an O/S encrypted the storage device and can avoid the presentation of a prompt for a password during the boot-up process performed by the FW. Accordingly, in sharp contrast to commonplace technologies, the disclosed technologies can limit the presentation of a prompt for a password to instances in which the firmware (or a firmware component thereof) has encrypted the storage device.

The subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, it is noted that other implementations can be performed in combination with other types of program modules. Generally, program modules include routines, programs, components, data structures, and other types of structures that perform particular tasks or implement particular abstract data types.

Aspects and/or elements of the subject matter described herein can be practiced on or in conjunction with other computer system configurations beyond those disclosed herein, including multiprocessor systems, microprocessor-based or programmable consumer electronics, minicomputers, mainframe computers, handheld computers, personal digital assistants, e-readers, mobile telephone devices, tablet computing devices, wearable devices, special-purpose hardware devices, network appliances, and the like.

The architectures and techniques disclosed herein can be practiced, in some embodiments, in distributed computing environments where tasks can be performed by remote computing devices that are linked or otherwise communicative coupled via a communication network. In a distributed computing environment, program modules can be located in both local memory storage devices and remote memory storage devices.

Figure 1:
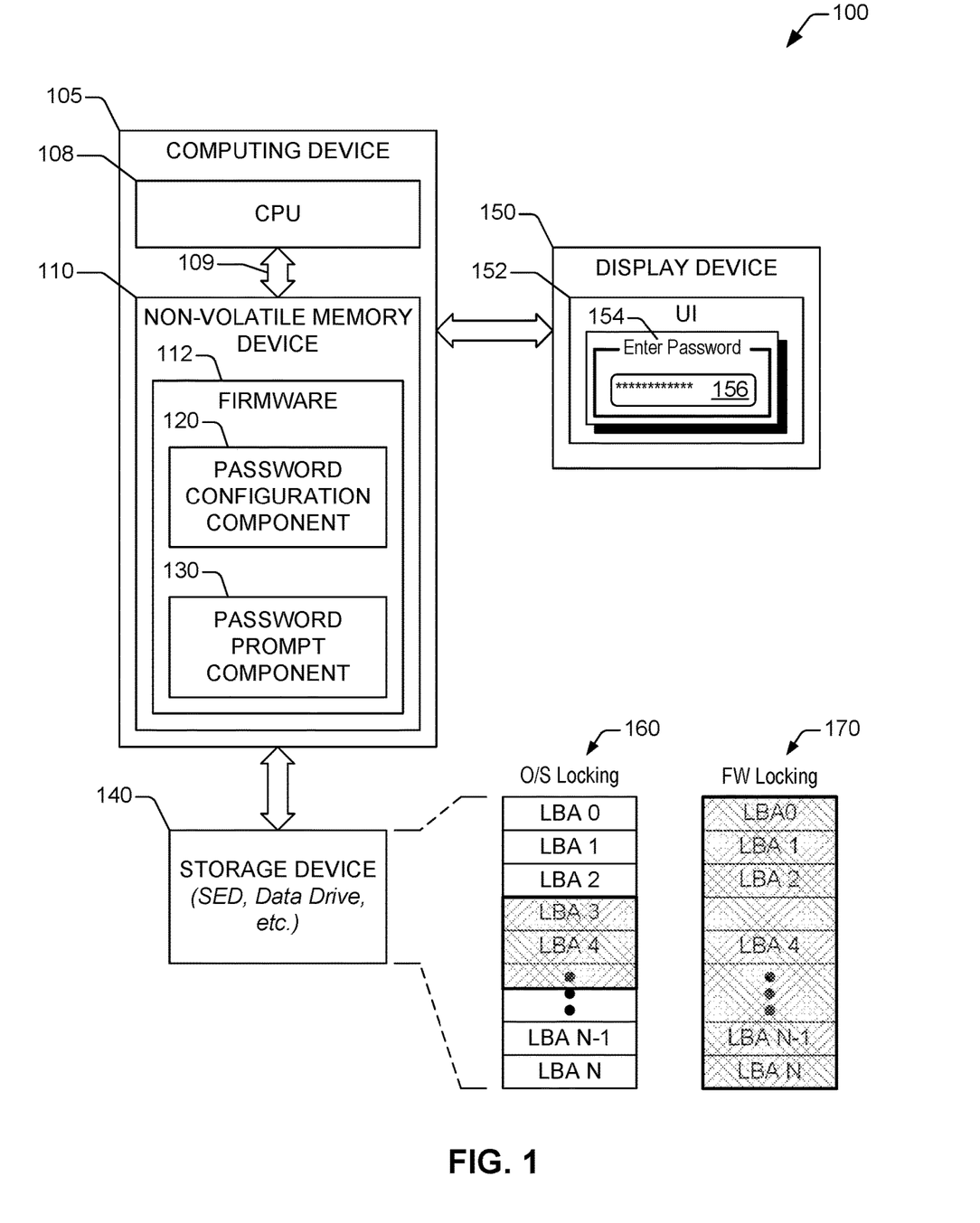
FIG. 1 illustrates an example of a computing architecture to control a prompt for a credential (a password, a numerical code, a combination thereof, or the like) to unlock a computer-readable storage device, in accordance with one or more embodiments of the disclosure.

With reference to the drawings, FIG. 1 illustrates an example of a computing architecture 100 for control of a prompt for a credential to unlock a storage device, in accordance with one or more embodiments of the disclosure. The exemplified computing architecture 100 includes a computing device 105 that includes a central processing unit (CPU) 108 and a non-volatile memory device 110 (e.g., a flash memory device) mutually coupled by means of a bus architecture 109. In some embodiments, the computing device 105 ca include more than one CPU. While not illustrated in FIG. 1, the computing device 105 also can include other types of computing resources that can permit or otherwise facilitate the execution of device-accessible components retained in the non-volatile memory device 110. Such computer resources can include, for example, a graphic processing unit (GPU), a volatile memory device, mass storage, network adapters, I/O interfaces, controller devices, power supplies, a combination thereof, or the like. The computing device 105 can be embodied in, for example, a desktop computer, a laptop computer, a blade service device, a tablet computer, a smartphone, a videogame console, or the like.

The non-volatile memory device 110 has encoded thereon firmware 112. The firmware 112 includes device-accessible instructions (e.g., computer-readable instruction and/or computer-executable instructions) and device-readable data configured to be executed by the CPU 108 in order to cause the CPU 108 to provide firmware functionality. Such instructions and/or data can be arranged, in some configurations, as individually executable components, each being uniquely identifiable. Thus, the CPU 108 that can execute the firmware 112 to provide functionality in accordance with this disclosure. The CPU 108 can include one or multiple processors, each having at least one processing core. The processor(s) can be assembled in one or many computing chipsets included in the computing device 105.

In some embodiments, the firmware 112 can be implemented to be compliant with the UEFI Specification. Thus, in such embodiments, the components included in the firmware 112 comply with the UEFI Specification.

The computing device 105 can be functionally coupled to a computer-readable storage device 140. In some embodiments, the computer-readable storage device 140 can be embodied in, or can include, a disk drive, such as a SED or a data drive. The disclosure, however, is not limited to SEDs and data drives, and also contemplates other types of storage devices.

In an embodiment in which the computer-readable storage device 140 is embodied in a SED, the SED can be compliant with the Opal Storage Specification published by the Trusted Computing Group Storage Workgroup. Briefly, the Opal Storage Specification defines, amongst other things, an approach to encrypting stored data in a way that an unauthorized person who gains possession of the computer-readable storage device 140 cannot access the data.

In some embodiments, the entire addressable LBA range of the computer-readable storage device 140 can be encrypted using a password or another type of credential. Additionally, or in the alternative, a band of LBA blocks can be selected to be encrypted using a password. The band of LBA blocks includes contiguous LBA blocks ranging from a first LBA block to a second LBA block. Such a password or other credential can be selected and configured by the firmware 112, via a password configuration component 120.

The specific scope of LBAs that are password protected can be specific to a component that encrypts the computer-readable storage device 140. For instance, the firmware 112 can typically (if not always) encrypt the entire LBA range, as is illustrated in diagram 170 with a cross-hatched section. Simply for the sake of illustration, the entire LBA range is represented by NLBA blocks: LBA 0, LBA 1, LBA 2, . . . LBA N−1, and LBA N. Here LBA 0 (also noted herein as LBA0) is the master boot record. Therefore, the computer-readable storage device 140 cannot be used to boot-up to an O/S unless the computer-readable storage device 140 is unencrypted using a defined password. An O/S, however, cannot encrypt the computer-readable storage device 140 because the O/S cannot boot if the entire computer-readable storage device, including the boot block portion of such a device, has been encrypted. Thus, the O/S typically (if not always) can encrypt a defined band of LBA blocks, as is illustrated in element 160 with a cross-hatched section. Such a defined band is simply illustrative and, in some embodiments, another band of LBA blocks or even more than one band of LBA blocks can be encrypted by the O/S.

As is illustrated in the element 160, the defined band of LBA ranges that can be encrypted by the O/S excludes LBA0 (master boot record). Accordingly, the O/S excludes LBA0 from a password-protected range. In contrast, the firmware 112 has to read LBA0 in order to boot-up from the computer-readable storage device 140. Thus, the firmware 112 can determine whether the computer-readable storage device 140 has been encrypted by the firmware 112 itself or an O/S.

Specifically, the firmware 112 can determine if the computer-readable storage device 140 is in an encrypted state. As is illustrated in FIG. 1, in some embodiments, a password prompt component 130 included in the firmware 112 can perform such a determination. The password prompt component 130 executes during the boot-time of the firmware 112. In response to the computer-readable storage device 140 being in the encrypted state, the firmware 112 can attempt to read LBA0. In an instance in which LBA0 read fails, the firmware 112 can then determine that the computer-readable storage device 140 is encrypted by the firmware 112. It is noted that the disclosure is not limited to reading LBA0. Indeed, the firmware 112 can read or can attempt to read at least one defined LBA block. For instance, in some embodiments, the firmware 112 can read a defined LBA block, such as LBA J (with $0<J\leq N$, FIG. 1). In other embodiments, the firmware 112 can read a storage region spanning a band of LBA blocks ranging from a first LBA block to a second LBA block.

Further, in response to a determination that the computer-readable storage device 140 is encrypted by the firmware 112, the firmware 112 can prompt for a password (or, in some instances, another type of credential). To that, in one example, the firmware 112 can cause a display device 150 to present a user interface (UI) 152 that includes a first UI element 154 and a second UI element 156. The first UI element 154 conveys a directive to supply the password. The second element 156 is selectable and permits receiving input information indicative of the password from a user, for example. Again, in some embodiments, the password prompt component 130 can prompt for the password. In response to the password permitting to decrypt the computer-readable storage device 140, the computer-readable storage device 140 can be used to complete a boot-up process of the computing device 105.

Furthermore, in an instance in which the computer-readable storage device 140 is in an encrypted state and reading of LBA0 is successful, the firmware 112 can continue to boot from the computer-readable storage device 140. In such an instance, the O/S can handle unlocking a range of LBAs that the O/S encrypted.

Figure 2:
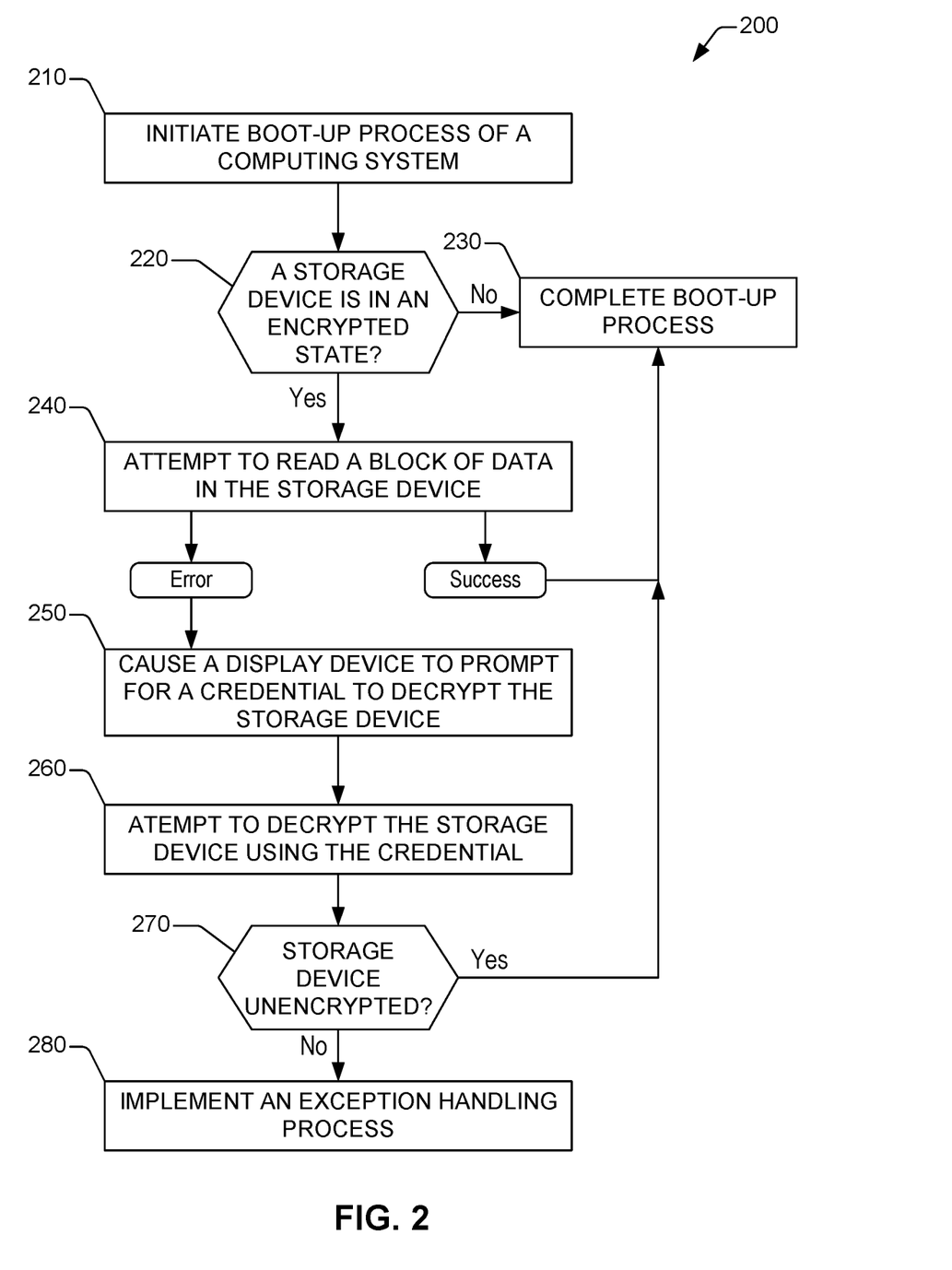
FIG. 2 illustrates an example of a method for controlling a prompt for a credential (a password, a numerical code, a combination thereof, or the like) to unlock a computer-readable storage device, in accordance with one or more embodiments of the disclosure.

FIG. 2 illustrates a flowchart of an example method 200 for controlling the presentation of a prompt to enter a credential to unlock a computer-readable storage device, in accordance with one or more embodiments of the disclosure. As mentioned, the computer-readable storage device can be included in a host computing device. The computer-readable storage device can be embodied in or can include a SED, a data drive, or the like.

The example method 200 is illustrated as a collection of blocks in a logical flow graph, which represent a sequence of operations that can be implemented in hardware, software, or a combination thereof. In the context of software, the blocks can represent computer-executable instructions that, when executed by one or more processors, perform the recited operations. Generally, computer-executable instructions can embody, or can constitute, routines, programs, objects, components, data structures, and the like configured to cause a computing device to perform or implement particular functions. The order in which operations are described is not intended to be construed as a limitation. Any number of the described blocks can be combined in any order and/or, in some instances, two or more of the blocks can be implemented in parallel in order to perform the example method 200. Other techniques described throughout this disclosure can be interpreted accordingly.

A processor, or multiple processors, executing a firmware (e.g., firmware 112, FIG. 1) of a host computing device can perform the example method 200. The host computing device can be embodied in, or can include, for example, the computing device 105. The firmware can include machine-accessible instructions that, in response to execution by the processor, can cause the processor to perform the example method 200. For instance, at least a portion of the machine-accessible instructions can embody or can constitute the password prompt component 130 described herein. Such machine-accessible instructions can be encoded on a non-transitory computer-readable storage medium, such as one or more memory devices.

In some embodiments, the processor(s) can be assembled in one or many computing chipsets, each processor including one or more processing cores. The processor(s) can constitute a CPU(s), GPU(s), or other types of processing circuitry. The example method 200 can be performed as part of a boot-up process of a computing system that includes the host computing device and the storage device, in accordance with aspects of this disclosure. Specifically, the example method 200 can be performed, for example, as part of a boot-up process of the computing device 105 that includes the non-volatile memory device 110 and the computer-readable storage device.

At block 210, the processor(s) executing the firmware can initiate a boot-up process for the computing system. At block 220, in response to execution by the processor(s), the firmware can determine if a computer-readable storage device (e.g., storage device 140) included in the computing system is in an encrypted state. To that end, in one embodiment, the firmware can execute a defined group of commands or instructions to probe the encryption status of the computer-readable storage device. For instance, the group of commands can include a command that, in response to execution, returns the status of the computer-readable storage device, where the status is either encrypted or non-encrypted. Such a command can be, in one example, a Level 0 Locking feature command. In response to a negative determination ("No" branch in FIG. 2), the flow of the example method 200 can continue to block 230, where the firmware can complete the boot-up process in a typical fashion in response to execution by the processor(s).

In the alternative, the flow of the example method 200 can continue to block 240 in response to an affirmative determination ("Yes" branch in FIG. 2). At block 240, in response to execution by the processor(s), the firmware can attempt to read an initial block of data in the computer-readable storage device. More concretely, in some embodiments, the firmware can attempt to read a defined LBA block, such as LBA0. In other embodiments, the firmware can attempt to read a storage region spanning a band of LBA blocks ranging from a first LBA block to a second LBA block.

As is discussed herein, in an instance in which the computer-readable storage device has been encrypted by an O/S, the attempt can be successful (depicted by the "Success" label in FIG. 2) and flow of the example method 200 can continue to block 230. In another instance, the attempt can result in an error and, in response, the flow of the example method 200 can continue to block 250. At such a block, in response to execution by the processor(s), the firmware can cause a display device to prompt for a credential to unlock the storage device. The credential can be a password or a numerical code, for example. The display device is functionally coupled to at least one of the processor(s) and can be either integrated in the computing device or functionally coupled thereto. The display device can be the display device 150, FIG. 1.

At block 260, in response to execution by the processor(s), the firmware can attempt to decrypt the computer-readable storage device using the credential (e.g., a password or a numerical code). At block 270, the firmware can determine if the computer-readable storage device is unencrypted in response to the attempt. The flow of the example method 200 can continue to block 280 in response to a negative determination (additional "No" branch in FIG. 2). At block 280, in response to execution by the processor(s), the firmware can implement an exception handling process. In some embodiments, implementing the exception handling process can include causing the display device to present an error message. An affirmative determination at block 270 (additional "Yes" branch in FIG. 2) results in the flow of the example method 200 continuing to block 230.

Figure 3:
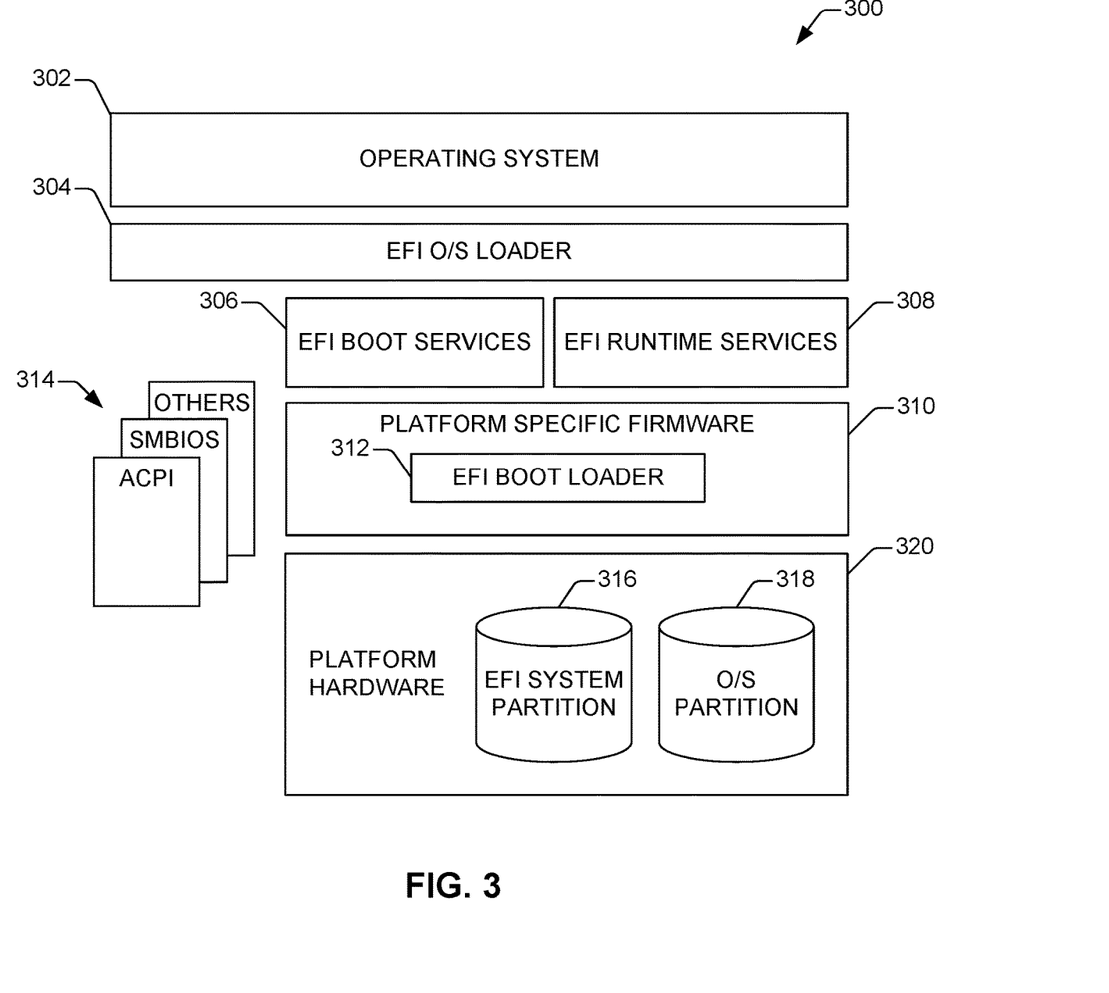
FIG. 3 illustrates an example of a software architecture for a unified extensible firmware interface (UEFI)-compliant firmware that provides an operating environment for aspects of the technologies presented herein in one or more embodiments.

FIG. 3 illustrates an example of a software architecture 300 that includes a UEFI Specification-compliant firmware that can be configured to provide and/or utilize aspects of the technologies disclosed herein. In particular, the firmware architecture shown in FIG. 3 can be utilized to implement the firmware 112 described above. The firmware 112 can also be implemented in other ways in other configurations.

The UEFI Specification describes an interface between an operating system 302 and a UEFI Specification-compliant firmware 300, such as the firmware 112. The UEFI Specification also defines an interface that the firmware 300 can implement, and an interface that the operating system 302 (which might be referred to herein as an OS) can use while booting. How a firmware implements the interface can be left up to the manufacturer of the firmware. The UEFI Specification also defines a way for the operating system 302 and the firmware 300 to exchange information necessary to support the operating system boot process. The terminology "UEFI Specification" used herein refers to both the EFI Specification developed by INTEL CORPORATION and the UEFI Specification managed by the UEFI FORUM.

As is illustrated in FIG. 3, the architecture can include platform hardware 320, such as that described below with regard to FIG. 4, and the operating system 302. A boot loader 312 for the operating system 302 can be retrieved from the UEFI system partition 316 using a UEFI operating system loader 304. The UEFI system partition 316 can be an architecturally shareable system partition. As such, the UEFI system partition 316 can define a partition and file system designed to support safe sharing of mass storage between multiple vendors. An OS partition 318 can also be utilized.

Upon or after started, the UEFI OS loader 304 can continue to boot the complete operating system 302. In doing so, the UEFI OS loader 304 can use UEFI boot services 306, an interface to other supported specifications to survey, comprehend, and initialize the various platform components and the operating system software that manages them. Thus, interfaces 314 from other specifications can also be present on the system. For example, the ACPI and the System Management BIOS (SMBIOS) specifications can be supported.

UEFI boot services 306 can provide interfaces for devices and system functionality used during boot time. UEFI runtime services 308 can also be available to the UEFI OS loader 304 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 302 and firmware 300, the Framework is a group of specifications that together describe a firmware implementation that has been designed to perform the full range of operations that are required to initialize a platform from power on through transfer of control to the operating system 302. The specifications that make up the Framework, which are also available from INTEL CORPORATION, are also expressly incorporated herein by reference.

Figure 4:
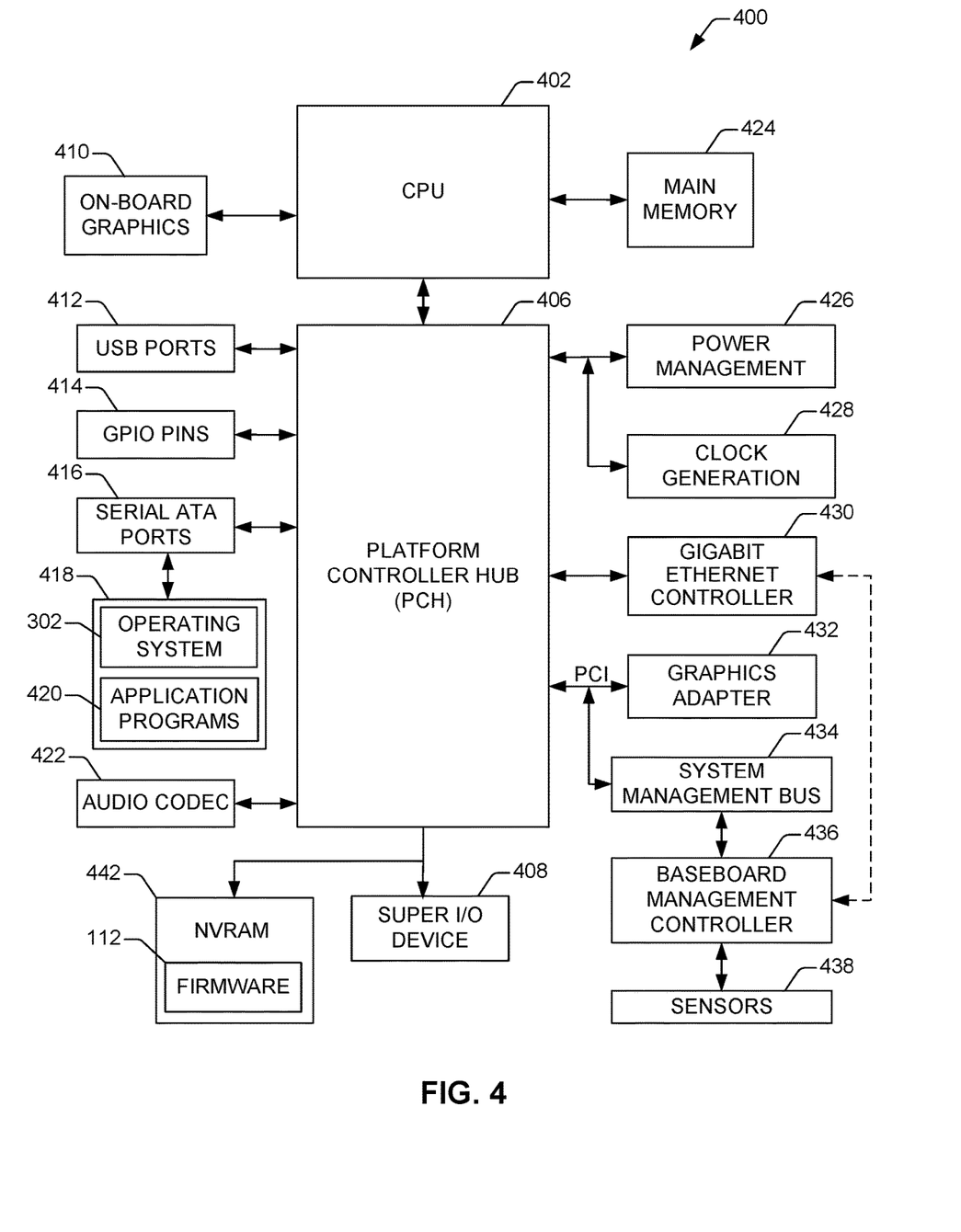
FIG. 4 illustrates an example of a computer architecture for a computing device that can implement the technologies disclosed herein, in accordance with one or more embodiments.

FIG. 4 illustrates an example of a computer architecture that can provide an operating environment for the technologies presented herein. For example, the computer architecture can be utilized to implement the computing architecture 100 and/or any of the other managed computing systems disclosed herein.

FIG. 4 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules can include routines, programs, components, data structures, and other types of structures that perform particular tasks or implement particular abstract data types. Moreover, it is noted that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 4 illustrates an example of a computer architecture for a computing device 400 that can be utilized in implementations of the technologies disclosed herein. In some embodiments, the computer 400 can embody or can constitute the computing device 105. The illustrative computer architecture shown in FIG. 4 includes a baseboard, or "motherboard", which is a printed circuit board to which a multitude of components or devices can be connected by way of a system bus or other electrical communication path. In one configuration, a CPU 402 operates in conjunction with a Platform Controller Hub (PCH) 406. The CPU 402 is a central processor that performs arithmetic and logical operations necessary for the operation of the computer 400. The computer 400 can include a multitude of CPUs 402. Each CPU 402 can include multiple processing cores.

The CPU 402 provides an interface to one or more RAM devices used as the main memory 424 in the computer 400 and, possibly, to an on-board graphics adapter 410. The PCH 406 provides an interface between the CPU 402 and the remainder of the computer 400. The CPU 402 can embody or can include the processor(s) that can perform the example method 200 (see FIG. 2) disclosed herein.

The PCH 406 can also be responsible for controlling many of the input/output functions of the computer 400. In particular, the PCH 406 can provide one or more universal serial bus (USB) ports 412, an audio codec 422, a Gigabit Ethernet Controller 432, and one or more general purpose input/output (GPIO) pins 414. The USB ports 412 can include USB 2.0 ports, USB 3.0 ports and USB 3.1 ports among other USB ports. The audio codec 422 can include Intel High Definition Audio, Audio Codec '97 (AC'97) and Dolby TrueHD among others.

The PCH 406 can also include functionality for providing networking functionality through a Gigabit Ethernet Controller 430. The Gigabit Ethernet Controller 430 is capable of connecting the computer 400 to another computer via a network. Connections which can be made by the Gigabit Ethernet Controller 430 can include LAN or WAN connections. LAN and WAN networking environments are commonplace in offices, enterprise-wide computer networks, intranets, and the Internet.

The PCH 406 can also provide a bus for interfacing peripheral card devices, such as the on-board graphics adapter 410. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express bus among others.

The PCH 406 can also provide a system management bus 434 for use in managing the various components of the computer 400. Additional details regarding the operation of the system management bus 434 and its connected components are provided below. Power management circuitry 426 and clock generation circuitry 428 can also be utilized during the operation of the PCH 406.

The PCH 406 is also configured to provide one or more interfaces for connecting mass storage devices to the computer 400. For instance, according to one configuration, the PCH 406 includes a serial advanced technology attachment (SATA) adapter for providing one or more serial ATA ports 416. The serial ATA ports 416 can be connected to one or more mass storage devices storing an OS, such as OS 1802 and application programs 420, such as a SATA disk drive 418. As known to those skilled in the art, an OS 1802 comprises a set of programs that control operations of a computer and allocation of resources. An application program is software that runs on top of the operating system 1802, or other runtime environment, and uses computer resources to perform application specific tasks desired by the user.

According to one configuration, the OS 1802 comprises the LINUX operating system. According to another configuration, the OS 1802 comprises the WINDOWS operating system from MICROSOFT CORPORATION. According to another configuration, the OS 1802 comprises the UNIX operating system or one of its variants. It is noted that other operating systems can also be utilized.

The mass storage devices connected to the PCH 406, and their associated computer-readable storage media, provide non-volatile storage for the computer 400. Although the description of computer-readable storage media contained herein refers to a mass storage device, such as a hard disk or CD-ROM drive, it is noted that computer-readable storage media can be any available media that can be accessed by the computer 400.

As an illustration, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 400.

Communication media can embody information in a data signal, such as a modulated data signal (e.g., a carrier wave or another transport mechanism) and includes information delivery media or transport media. In some embodiments, the information can include machine-accessible instructions (e.g., computer-readable instructions and/or computer-executable instructions), data structures, program modules, or other structured or unstructured data. The terminology "modulated data signal" as utilized herein refers to a signal that has one or more of its characteristics set or changed in such a manner as to encode information in the signal. Communication media include wired media and wireless media. For example, wired media can include a wired network and/or direct-wired connection including solid-state media for the transport of signals. As another example, wireless media can include numerous media for the wireless transport of electromagnetic radiation, such as acoustic waves, RF waves, infrared waves, microwave waves, and other forms of electromagnetic waves.

A low pin count (LPC) interface can also be provided by the PCH 406 for connecting a Super I/O device 408. The Super I/O device 408 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 442 for storing the firmware 112 that includes program code containing the basic routines that help to start up the computer 400 and to transfer information between elements within the computer 400 as discussed above with regard to FIG. 3. In some embodiments, the NVRAM 442 can embody or can constitute the non-volatile memory device 110.

The program modules disclosed herein, including the firmware 112, can include software instructions that, when loaded into the CPU 402 and executed, transform a general-purpose computer into a special-purpose computer customized to permit or otherwise facilitate all, or part of, the operations disclosed herein. As detailed throughout this disclosure, the program modules can provide various tools or techniques by which the computer 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules. These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the Gigabit Ethernet Controller 430), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to: the technology used to implement the storage media, whether the storage media are characterized as primary or secondary storage, and the like. For example, if the storage media are implemented as semiconductor-based memory, the program modules can transform the physical state of the main memory 424 (e.g., a semiconductor solid-state memory device) and/or the NVRAM 404. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described herein, the PCH 406 can include a system management bus 434. As discussed above, when utilized to implement the computing architecture 100. The BMC 436 is a microcontroller that monitors operation of the computer 400. In a more specific configuration, the BMC 436 monitors health-related aspects associated with the computer 400, such as, but not limited to, the temperature of one or more components of the computer 400, speed of rotational components (e.g., spindle motor, CPU fan, etc.) within the computer 400, the voltage across or applied to one or more components within the computer 400, and the available and/or used capacity of memory devices within the computer 400. To accomplish these monitoring functions, for example, the BMC 436 can be communicatively connected to one or more components by way of the system management bus 434 in some configurations.

In one configuration, these components include sensor devices 438 for measuring various operating and performance-related parameters within the computer 400. The sensor devices 438 can be either hardware-based or software-based components configured or programmed to measure or detect one or more of the various operating and performance-related parameters.

The BMC 436 functions as the master on the system management bus 434 in most circumstances, but can also function as either a master or a slave in other circumstances. Each of the various components communicatively connected to the BMC 436 by way of the system management bus 434 is addressed using a slave address. The system management bus 434 is used by the BMC 436 to request and/or receive various operating and performance-related parameters from one or more components, such as the firmware 112, which are also communicatively connected to the system management bus 434.

It is noted that the functionality provided by the computer 400 can be provided by other types of computing devices, including hand-held computers, smartphones, gaming systems, set top boxes, tablet computers, embedded computer systems, personal digital assistants, wearable devices, and other types of computing devices available in the art. It is also contemplated that the computer 400 might not include all the components shown in FIG. 4; can include other components that are not explicitly shown in FIG. 4; or might utilize an architecture completely different than that shown in FIG. 4.

Other example embodiments. Numerous other embodiments emerge from the foregoing detailed description and annexed drawings. For instance, an Example 1 of those embodiments includes a computer-implemented method. The computer-implemented method includes initiating, by a computing device comprising at least one processor, execution of a firmware configured to perform a boot-up process; determining, by the firmware, that a computer-readable storage device is in an encrypted state; attempting, by the firmware, to read an initial block of data in the computer-readable storage device; causing, by the firmware, a display device to prompt for a credential to decrypt the storage device in response to the attempting being unsuccessful; attempting, by the firmware, to decrypt the storage device using the credential; determining, by the firmware, that the storage device is unencrypted; and completing the boot-up process by the firmware.

An Example 2 of the numerous embodiments includes the computer-implemented method of Example 1, where the attempting to read the initial block of data comprises attempting to read a region spanning a band of logical block address (LBA) blocks ranging from a first LBA block to a second LBA block.

An Example 3 of the numerous embodiments includes the computer-implemented method of any of Example 1 or Example 2, where the attempting to read the initial block of data comprises attempting to read a defined logical block address (LBA) block.

An Example 4 of the numerous embodiments includes the computer-implemented method of any of Example 1, Example 2, or Example 3, where the determining that the computer-readable storage device is in an encrypted state comprises determining that a self-encrypting drive (SED) is in the encrypted state, wherein the SED complies with the Opal Storage Specification published by the Trusted Computing Group Storage Workgroup.

An Example 5 of the numerous embodiments includes the computer-implemented method of any of Example 1, Example 2, Example 3, or Example 4, where the determining that the computer-readable storage device is in an encrypted state comprises executing at least one command to probe the encryption status of the computer-readable storage device, resulting in an indication of the encrypted state.

An Example 6 of the numerous embodiments includes the computer-implemented method of any of Example 1, Example 2, Example 3, Example 4, or Example 5, where the causing comprises causing the display device to present a user interface (UI) comprising a first UI element representing a directive to supply the credential and a second UI element to receive input information indicative of the credential, the credential being a password or a numerical code.

An Example 7 of the numerous embodiments includes a computing device. The computing device includes at least one processor; and at least one memory device having computer-executable components stored thereon that, in response to execution by the at least one process, cause the computing device at least to: initiate execution of a firmware configured to perform a boot-up process; determine, by means of the firmware, that a computer-readable storage device is in an encrypted state; attempt, by means of the firmware, to read an initial block of data in the computer-readable storage device; determine, by means of the firmware, that the attempt is unsuccessful; cause, by means of the firmware, a display device to prompt for a credential to decrypt the storage device in response to the attempt being unsuccessful; attempt, by means of the firmware, to decrypt the storage device using the credential; determine, by means for the firmware, that the computer-readable storage device is unencrypted; and complete the boot-up process by the firmware.

An Example 8 of the numerous embodiments includes the computing device of Example 7, where attempting to read the initial block of data comprises attempting to read a region spanning a band of logical block address (LBA) blocks ranging from a first LBA block to a second LBA block.

An Example 9 of the numerous embodiments includes the computing device of any of Example 7 or Example 8, wherein attempting to read the initial block of data comprises attempting to read a defined logical block address (LBA) block.

An Example 10 of the numerous embodiments includes the computing device of any of Example 7, Example 8, or Example 9, where determining that the computer-readable storage device is in an encrypted state comprises determining that a self-encrypting drive (SED) is in the encrypted state, wherein the SED complies with the Opal Storage Specification published by the Trusted Computing Group Storage Workgroup.

An Example 11 of the numerous embodiments includes the computing device of any of Example 7, Example 8, Example 9, or Example 10, where determining that the computer-readable storage device is in an encrypted state comprises executing at least one command to probe the encryption status of the computer-readable storage device, resulting in an indication of the encrypted state.

An Example 12 of the numerous embodiments includes the computing device of any of Examples 7, Example 8, Example 9, Example 10, or Example 11, where the computing device is one of a desktop computer, a laptop computer, a blade server device, a tablet computer, a smartphone, or a videogame console.

An Example 13 of the numerous embodiments includes at least one computer-readable non-transitory storage medium having instructions stored thereon that, in response to execution, cause a computing device to perform or facilitate operations comprising: initiating execution of a firmware configured to perform a boot-up process; determining, by the firmware, that a computer-readable storage device is in an encrypted state; attempting, by the firmware, to read an initial block of data in the computer-readable storage device; causing, by the firmware, a display device to prompt for a credential to decrypt the storage device in response to the attempting being unsuccessful; attempting, by the firmware, to decrypt the storage device using the credential; determining, by the firmware, that the storage device is unencrypted; and completing the boot-up process by the firmware.

An Example 14 of the numerous embodiments includes the at least one computer-readable non-transitory storage medium of Example 13, where the attempting to read the initial block of data comprises attempting to read a region spanning a band of logical block address (LBA) blocks ranging from a first LBA block to a second LBA block.

An Example 15 of the numerous embodiments includes the at least one computer-readable non-transitory storage medium of any of Example 13 or Example 14, where the attempting to read the initial block of data comprises attempting to read a defined logical block address (LBA) block.

An Example 16 of the numerous embodiments includes the at least one computer-readable non-transitory storage medium of any of Example 13, Example 14, or Example 15, where the determining that the computer-readable storage device is in an encrypted state comprises determining that a self-encrypting drive (SED) is in the encrypted state, and where the SED complies with the Opal Storage Specification published by the Trusted Computing Group Storage Workgroup.

An Example 17 includes the at least one computer-readable non-transitory storage medium of any of Example 13, Example 14, Example 15, or Example 16, where the determining that the computer-readable storage device is in an encrypted state comprises executing at least one command to probe the encryption status of the computer-readable storage device, resulting in an indication of the encrypted state.

An Example 18 of the numerous embodiments includes the at least one computer-readable non-transitory storage medium of any of Example 13, Example 14, Example 15, Example 16, or Example 17, where the causing comprises causing the display device to present a user interface (UI) comprising a first UI element representing a directive to supply the credential and a second UI element to receive input information indicative of the credential, the credential being a password or a numerical code.

Based on the foregoing, technologies for providing or otherwise facilitating control of a prompt of a password to unlock a storage device and applications therefore have been disclosed herein. Although the subject matter presented herein has been described in language specific to computer structural features, methodological acts, and computer readable media, it is to be understood that the present disclosure is not necessarily limited to the specific elements, features, acts, or non-transitory storage media disclosed herein. Rather, the specific elements, features, acts, and non-transitory storage media are disclosed as example forms.

The subject matter disclosed herein is provided by way of illustration only and should not be construed as limiting. Various modifications and changes can be made to the subject matter described herein without following the example configurations and applications illustrated and described, and without departing from the true spirit and scope of the present disclosure.

What is claimed is:

1. A computer-implemented method, comprising:
initiating, by a computing device comprising at least one processor, execution of a firmware configured to perform a boot-up process;
determining, by the firmware, that a computer-readable storage device is in an encrypted state;
attempting, by the firmware, to read a region in the computer-readable storage device spanning a band of logical block address (LBA) blocks ranging from a first LBA block to a second LBA block;
causing, by the firmware, a display device to prompt for a credential to decrypt the computer-readable storage device in response to the attempting being unsuccessful;
attempting, by the firmware, to decrypt the computer-readable storage device using the credential;
determining, by the firmware, that the computer-readable storage device is unencrypted; and
completing the boot-up process by the firmware.

2. The computer-implemented method of claim 1, wherein the determining that the computer-readable storage device is in an encrypted state comprises determining that a self-encrypting drive (SED) is in the encrypted state, wherein the SED complies with the Opal Storage Specification published by the Trusted Computing Group Storage Workgroup.

3. The computer-implemented method of claim 1, wherein the determining that the computer-readable storage device is in an encrypted state comprises executing at least one command to probe the encryption status of the computer-readable storage device, resulting in an indication of the encrypted state.

4. The computer-implemented method of claim 1, wherein the causing comprises causing the display device to present a user interface (UI) comprising a first UI element representing a directive to supply the credential and a second UI element to receive input information indicative of the credential, the credential being a password or a numerical code.

5. A computing device, comprising:
at least one processor; and
at least one memory device having computer-executable components stored thereon that, in response to execution by the at least one processor, cause the computing device at least to:
initiate execution of a firmware configured to perform a boot-up process;
determine, by the firmware, that a computer-readable storage device is in an encrypted state;
attempt, by the firmware, to read a region of the computer-readable storage device spanning a band of logical block address (LBA) blocks ranging from a first LBA block to a second LBA block;
determine, by the firmware, that the attempt is unsuccessful;
cause, by the firmware, a display device to prompt for a credential to decrypt the computer-readable storage device in response to the attempt being unsuccessful;
attempt, by the firmware, to decrypt the computer-readable storage device using the credential;
determine, by the firmware, that the computer-readable storage device is unencrypted; and
complete the boot-up process by the firmware.

6. The computing device of claim 5, wherein determining that the computer-readable storage device is in an encrypted state comprises determining that a self-encrypting drive (SED) is in the encrypted state, wherein the SED complies with the Opal Storage Specification published by the Trusted Computing Group Storage Workgroup.

7. The computing device of claim 5, wherein determining that the computer-readable storage device is in an encrypted state comprises executing at least one command to probe the encryption status of the computer-readable storage device, resulting in an indication of the encrypted state.

8. At least one computer-readable non-transitory storage medium having instructions stored thereon that, in response to execution, cause a computing device to perform or facilitate operations comprising:
initiating execution of a firmware configured to perform a boot-up process;
determining, by the firmware, that a computer-readable storage device is in an encrypted state;
attempting, by the firmware, to read a region of a computer-readable storage device spanning a band of logical block address (LBA) blocks ranging from a first LBA block to a second LBA block;
causing, by the firmware, a display device to prompt for a credential to decrypt the computer-readable storage device in response to the attempting being unsuccessful;
attempting, by the firmware, to decrypt the computer-readable storage device using the credential;
determining, by the firmware, that the computer-readable storage device is unencrypted; and
completing the boot-up process by the firmware.

9. The at least one computer-readable non-transitory storage medium of claim 8, wherein the determining that the computer-readable storage device is in an encrypted state comprises determining that a self-encrypting drive (SED) is in the encrypted state, wherein the SED complies with the Opal Storage Specification published by the Trusted Computing Group Storage Workgroup.

10. The at least one computer-readable non-transitory storage medium of claim 8, wherein the determining that the computer-readable storage device is in an encrypted state comprises executing at least one command to probe the encryption status of the computer-readable storage device, resulting in an indication of the encrypted state.

11. The at least one computer-readable non-transitory storage medium of claim 8, wherein the causing comprises causing the display device to present a user interface (UI) comprising a first UI element representing a directive to supply the credential and a second UI element to receive input information indicative of the credential, the credential being a password or a numerical code.

12. A computer-implemented method, comprising:
initiating, by a computing device comprising at least one processor, execution of a firmware configured to perform a boot-up process;
determining, by the firmware, that a computer-readable storage device is in an encrypted state;
attempting, by the firmware, to read a defined logical block address (LBA) block of the computer-readable storage device;
causing, by the firmware, a display device to prompt for a credential to decrypt the computer-readable storage device in response to the attempting being unsuccessful;

attempting, by the firmware, to decrypt the computer-readable storage device using the credential;

determining, by the firmware, that the computer-readable storage device is unencrypted; and completing the boot-up process by the firmware.

13. The computer-implemented method of claim 12, wherein the determining that the computer-readable storage device is in an encrypted state comprises determining that a self-encrypting drive (SED) is in the encrypted state, wherein the SED complies with the Opal Storage Specification published by the Trusted Computing Group Storage Workgroup.

14. The computer-implemented method of claim 12, wherein the determining that the computer-readable storage device is in an encrypted state comprises executing at least one command to probe the encryption status of the computer-readable storage device, resulting in an indication of the encrypted state.

15. A computing device, comprising:
at least one processor; and
at least one memory device having computer-executable components stored thereon that, in response to execution by the at least one processor, cause the computing device at least to:
initiate execution of a firmware configured to perform a boot-up process;
determine, by the firmware, that a computer-readable storage device is in an encrypted state;
attempt, by the firmware, to read a defined logical block address (LBA) block of the computer-readable storage device;
determine, by the firmware, that the attempt is unsuccessful;
cause, by the firmware, a display device to prompt for a credential to decrypt the computer-readable storage device in response to the attempt being unsuccessful;
attempt, by the firmware, to decrypt the computer-readable storage device using the credential;
determine, by the firmware, that the computer-readable storage device is unencrypted; and
complete the boot-up process by the firmware.

16. The computing device of claim 15, wherein determining that the computer-readable storage device is in an encrypted state comprises determining that a self-encrypting drive (SED) is in the encrypted state, wherein the SED complies with the Opal Storage Specification published by the Trusted Computing Group Storage Workgroup.

17. The computing device of claim 15, wherein determining that the computer-readable storage device is in an encrypted state comprises executing at least one command to probe the encryption status of the computer-readable storage device, resulting in an indication of the encrypted state.

18. At least one computer-readable non-transitory storage medium having instructions stored thereon that, in response to execution, cause a computing device to perform or facilitate operations comprising:
initiating execution of a firmware configured to perform a boot-up process;
determining, by the firmware, that a computer-readable storage device is in an encrypted state;
attempting, by the firmware, to read a defined logical block address (LBA) block of the computer-readable storage device;
causing, by the firmware, a display device to prompt for a credential to decrypt the computer-readable storage device in response to the attempting being unsuccessful;
attempting, by the firmware, to decrypt the computer-readable storage device using the credential;
determining, by the firmware, that the computer-readable storage device is unencrypted; and
completing the boot-up process by the firmware.

19. The at least one computer-readable non-transitory storage medium of claim 18, wherein the determining that the computer-readable storage device is in an encrypted state comprises determining that a self-encrypting drive (SED) is in the encrypted state, wherein the SED complies with the Opal Storage Specification published by the Trusted Computing Group Storage Workgroup.

20. The at least one computer-readable non-transitory storage medium of claim 18, wherein the determining that the computer-readable storage device is in an encrypted state comprises executing at least one command to probe the encryption status of the computer-readable storage device, resulting in an indication of the encrypted state.

21. The at least one computer-readable non-transitory storage medium of claim 18, wherein the causing comprises causing the display device to present a user interface (UI) comprising a first UI element representing a directive to supply the credential and a second UI element to receive input information indicative of the credential, the credential being a password or a numerical code.

\* \* \* \* \*